US006238061B1

(12) United States Patent
McKenzie et al.

(10) Patent No.: US 6,238,061 B1
(45) Date of Patent: May 29, 2001

(54) COMBINATION LIGHTING SYSTEM, ALARM CLOCK, RADIO AND TELEVISION HAVING SECONDARY POWER SUPPLY

(76) Inventors: Roy L. McKenzie, 3960 Brookside Pkwy., Decatur, GA (US) 30034; Anthony Haynes, 1140 Maplewalk Cir., Decatur, GA (US) 30032

( * ) Notice: Subject to any disclaimer, the term of this patent is extended or adjusted under 35 U.S.C. 154(b) by 0 days.

(21) Appl. No.: 09/335,270

(22) Filed: Jun. 17, 1999

(51) Int. Cl.[7] .............................. F21V 33/00; H04N 7/00
(52) U.S. Cl. .......................... 362/253; 362/295; 348/552
(58) Field of Search .............................. 362/86, 208, 234, 362/253, 295, 410, 414; 348/61, 162, 164, 722, 552

(56) References Cited

U.S. PATENT DOCUMENTS 3,898,383 * 8/1975 Herbits ................................ 362/253
4,079,413 * 3/1978 Yamashita ............................ 348/552
4,676,619 * 6/1987 Woolley .............................. 362/253
5,055,986 * 10/1991 Johnson .............................. 362/253
5,163,747 * 11/1992 Cheng .................................... 362/86
5,465,198 * 11/1995 Kellogg ............................... 362/253
5,488,427 * 1/1996 Kayashima et al. ................. 348/569

* cited by examiner

Primary Examiner—Alan Cariaso
(74) *Attorney, Agent, or Firm*—Jerome J. Norris

(57) ABSTRACT

Emergency survival apparatus of a self-contained, portable, remote controlled, combination television receiver (TV), AM/FM radio receiver, clock, and electric lamp. The combination is powered by either a source of ordinary household alternating current or by a direct current source, such as a battery pack or motor vehicle battery. The lamp is provided with a dimmer switch, and the clock is provided with an alarm.

28 Claims, 2 Drawing Sheets

COMBINATION LIGHTING SYSTEM, ALARM CLOCK, RADIO AND TELEVISION HAVING SECONDARY POWER SUPPLY

BACKGROUND OF THE INVENTION

1. Field of the Invention

This invention relates to emergency lighting and public communication equipment in general, and to combination emergency lighting and public communication equipment in particular.

2. The Prior Art

There is a need for an effective way for responsible news agencies, weather authorities and government officials to disseminate information and instructions to the public in times of local or national emergency or in the event of a disaster. The public could receive such information by television and radio broadcasts that can be received by conventional radio and television receivers located in their homes.

For instance, when a power failure or black-out strikes a city, government officials, in the interest of exercising good government in accordance with their duties, have a responsibility to inform citizens as to the state of affairs as a result of the black-out and the progress of efforts to restore power. This is a needed procedure in order to enable officials to assure confidence in the populace and prevent panic.

Similarly, in the event of a disaster, such as an earthquake, tornado, hurricane or flood, in either an urban area or rural area, it is desirable that the inhabitants of those areas first be informed that such disaster is eminent (whenever it is possible to predict the disaster) and secondly, when the disaster actually does strike, what efforts are being made to recover from the disaster. On many occasions, there is a need to inform the public that an evacuation order has been issued, and all inhabitants of the areas must leave immediately for their own safety.

Moreover, it would be helpful to the public if they were reliably and conveniently informed of safe evacuation routes and the status of operating civil services. In addition to radio broadcast, history has shown that images received via television are extremely helpful to the public in presenting clear and graphic details of the emergency condition, evacuation routes, or adverse weather conditions. In addition, a visual display would ideally serve citizens who are hearing impaired; that is to say, by viewing a television picture, hearing impaired persons would be able to see exactly what conditions exist as a result of the emergency and what precautions and actions are best advised by the authorities.

In the past, there have been efforts to provide lighting and communication equipment that may be useful to the public during these emergencies. For example, U.S. Pat. No. 3,368,067, entitled Clock Radio Lamp Combination, provides a clock-radio combination having a high-intensity lamp, a clock and a radio. However, this combination can only be powered by a source of household alternating current, which in the case of a power failure or black-out, would not be useful for either lighting or receiving emergency instructions via the radio.

U.S. Pat. No. 5,055,986, entitled Combination Light, Radio and Clock, provides a device having a small incandescent light, a radio and clock, all housed within the same cabinet or housing. The light, clock and radio may be used during emergencies when energized by replaceable, rechargeable or non-rechargeable batteries. Unfortunately, this device does not include a television, which would be highly useful during an emergency to provide visual images of a disaster or evacuation routes, or adverse weather conditions. Moreover, the illumination provided by the incandescent light is insufficient to light a large area, such as the family room of a home.

Accordingly, there is a need for an emergency survival lamp apparatus, which would serve as a source of illumination during times of power failure, in combination with a radio for receiving emergency information and instructions, in combination with a television for receiving visual images of the emergency situation and weather conditions, that would offer the most effective and useful way to cope with the emergency situation. Incorporating a clock would further enhance the usefulness of such apparatus, in that a clock would allow the user to accurately keep track of time. In addition, such apparatus should be portable, and relatively small in size and lightweight, so that it can easily be moved from one location to another as may become necessary during an evacuation procedure.

In times when no emergency conditions exist, the television and the radio would provide entertainment for the entire family, and the lamp could be used as an ordinary source of light.

SUMMARY OF THE INVENTION

One object of the present invention is to provide a combination lamp, radio, clock, and television apparatus.

Another object of the present invention is to provide a combination lamp, radio, clock, and television apparatus for receiving emergency information and instructions.

A further object of the present invention is to provide a combination lamp, radio, clock, and television apparatus that can be powered by a source of direct current.

A still further object of the present invention is to provide a combination lamp, radio, clock, and television apparatus that is portable.

A further object yet still of the present invention is to provide a combination lamp, radio, clock, and television apparatus that serves as a source of entertainment.

A more complete appreciation of the present invention may be obtained from a review of the accompanying drawing figures, the following detailed description of a preferred embodiment and the appended claims.

DETAILED DESCRIPTION OF THE PREFERRED EMBODIMENTS

Figure 1:
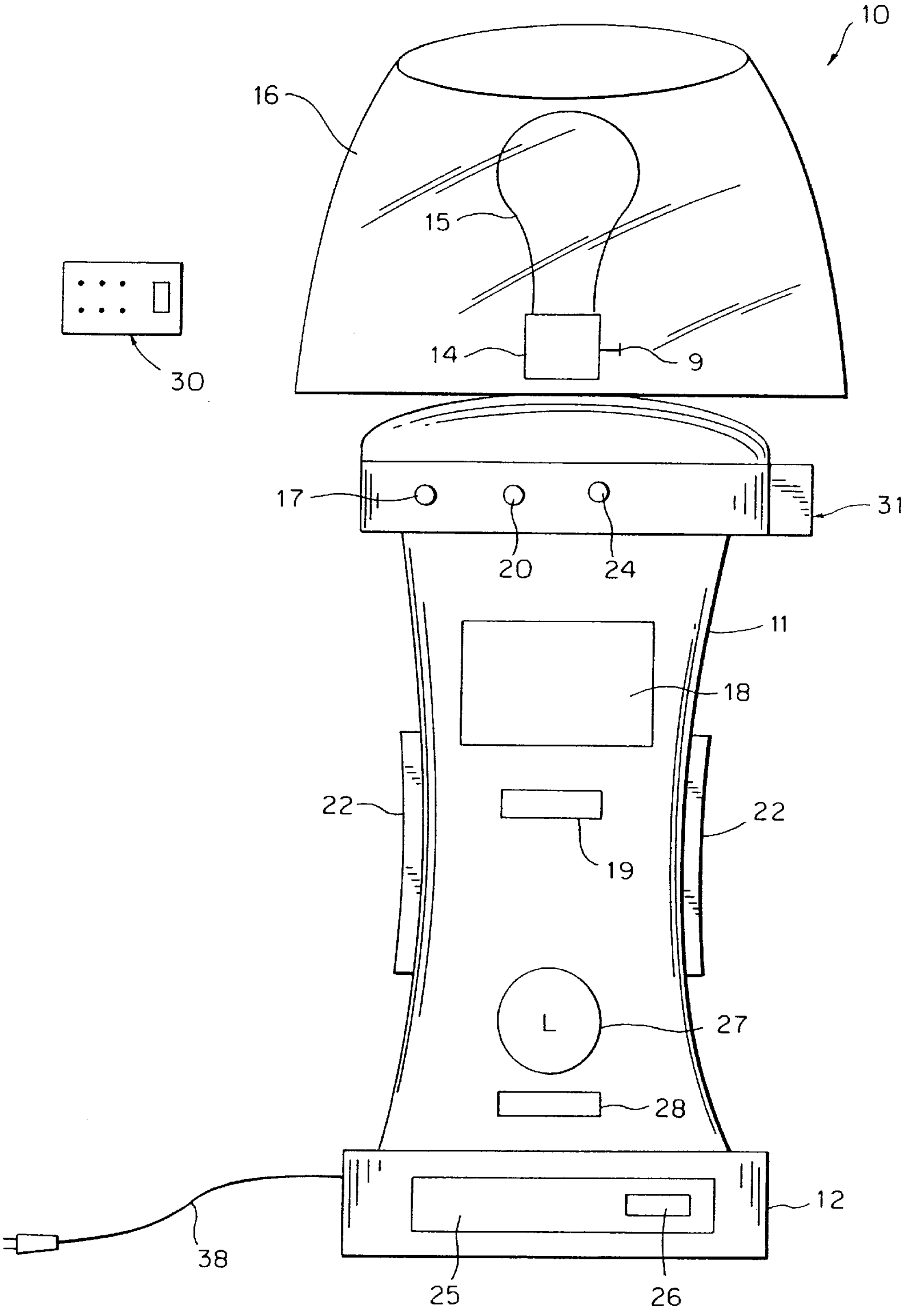
FIG. 1 shows a preferred embodiment of the emergency survival apparatus comprising a combined lamp, alarm clock, radio receiver and television receiver, integrally contained within a housing.

FIG. 1 shows a preferred embodiment of the present invention, hereafter referred to in the alternative as the apparatus 10. The apparatus 10 comprises several main sections representing a combined lamp, alarm clock, radio receiver and television receiver, all integrally contained within a housing 11.

The housing 11 is supported by a base 12 configured to allow the apparatus 10 to sit stably on a planar surface such as a table top or upon the floor. The lamp section comprises a source of illumination 15, a socket for the source of illumination 15, a shade 16 which covers the illumination source 15 so as to provide a pleasant lighting effect, a dimmer control 13, and a remote control signal sensor 17.

The source of illumination 15 and the shade 16 provide illumination in a 360 degree arc so as to light an entire room at once. The sensor 17 detects remote control signals that instruct the lamp section to energize or deenergize the source of illumination 15, as well as to decrease or increase the output from the illumination source 15.

The television receiver section comprises television signal receiving circuitry, a screen 18 for viewing the television pictures received, a control panel 19, and a remote control signal sensor 20.

The sensor 20 detects remote control signals that instruct the television receiver section to energize or deenergize the television receiver circuitry and television screen 18, as well as to increase or decrease the volume of sound associated with the television signal received.

The radio receiver section comprises radio signal receiving and processing circuitry, a control panel 25 which includes a tuning indicator or display 26 and a remote control signal sensor 24. The sensor 24 detects remote control signals that instruct the radio signal receiver to energize or deenergize the radio receiver circuitry, as well as to increase or decrease the volume of sound produced thereby.

A clock 27, having settable alarm capability, is provided with its own control panel 28. The clock control panel is used to both set the alarm time and to set the clock itself Loudspeakers 22 are provided to reproduce audible sound from the television receiver section, from the radio receiver section and from the alarm clock 27.

A battery-powered hand held remote control device 30 is provided so that the user can control all functions and features of the various sections of the invention 10. Upon the user's direction, the remote control 30 issues an infrared signal detectable by the respective and various remote control sensors 17, 20 and 24 in order to control the source of illumination 15, the television screen 18 and the radio 25, respectively.

In the alternative, if the user so chooses, each section of the apparatus can be controlled manual by their respective control panels. The lamp 15 can be manually turned on and off by a switch 9, and dimmed by the dimmer control 13. The television receiver section can be manually controlled by its control panel 19, and the radio receiver section can be manually controlled by its control panel 25.

Under normal conditions, the apparatus 10 is energized by a source of alternating current (AC) power, such as ordinary household current. The AC power is supplied to the present invention 10 via a power supply cord 38, when the power supply cord 38 is connected to an AC source in the usual manner.

However, upon the occurrence of an emergency situation, such as a power failure or black-out, the apparatus of the present invention may be energized by a direct current (DC) source, such as by battery pack 32. A battery compartment 31 serves to house the battery pack 32. The battery pack 32 may comprise one or more batteries. The batteries in the battery pack may be either disposable or rechargeable. In the case of the batteries being rechargeable, recharging power is obtained from converted alternating current via battery charging circuitry when the apparatus 10 is connected to a source of AC power by the AC power cord 38. In other words, the battery pack is constantly being recharged when the apparatus 10 is provided with AC power, so that in the event of an emergency situation, the illumination source 15, the radio 25, television 18, and the clock 27 will readily be available to the user.

Figure 2:
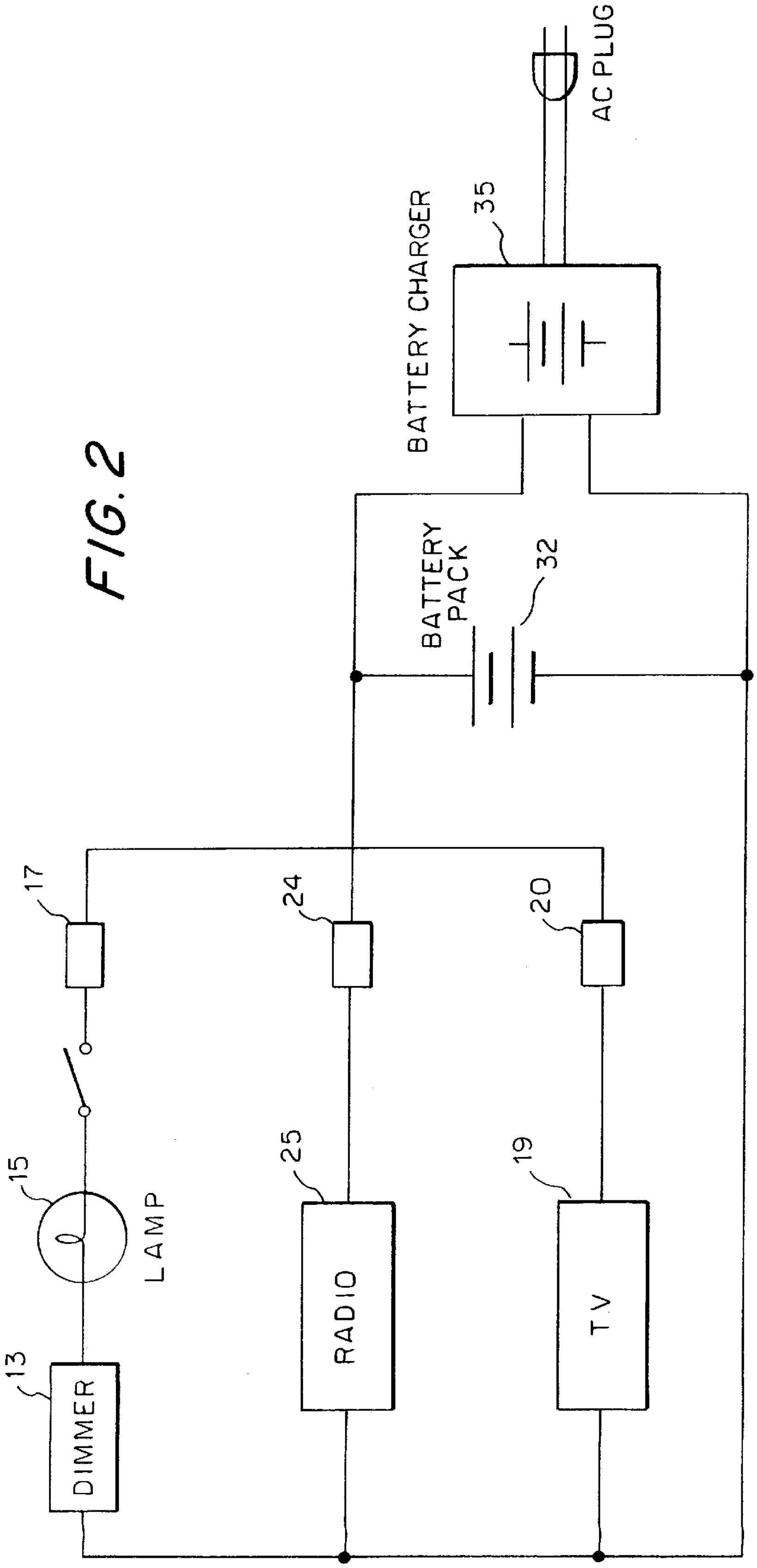
FIG. 2 shows a preferred embodiment of a schematic wiring diagram of the emergency survival apparatus.

FIG. 2 shows a schematic wiring diagram for the emergency survival apparatus of the present invention. The source of illumination 15 is in electrical connection with and energized by a source of power, either AC power supplied through the power supply cord 38, or DC power supplied from the battery pack 32. The case as to which source 38 or 32 is actually supplying power to the illumination source 15 depends on whether or not an emergency situation exists requiring use of the battery pack 32. Similarly, the radio receiver section and the television receiver section are also in electrical connection with the AC source and the DC source Another embodiment of the present invention comprising the lamp alone. As shown and discussed with respect to FIGS. 1 and 2, electrical power is provided by either a source of alternating current (AC) or by a source of direct current (DC), including the battery recharging features. A hand held remote control 30 similar to the one discussed with respect to FIG. 1 serves to control the lamp, that is to turn it on and off and control its brightness.

Yet another embodiment of the present invention comprises only the lamp and the radio receiver, in which case both are controllable by the hand held remote control 30, and the combination can be supplied by either AC power or DC power as discussed with respect to FIG. 1 wherein the battery pack 32 is supplied with recharging power by the battery charger Still another embodiment of the present invention comprises the lamp section and the radio receiver section, or the lamp section and the television receiver section. In either case however, electrical power is provided by either a source of alternating current (AC) or by a source of direct current (DC), wherein the battery pack 32 is supplied with recharging power by the battery charger 35.

While the present invention is herein shown and described in terms of preferred embodiments, it is to be expressly understood that the present invention is not limited thereto and may be variously configured. Thus, the scope of the invention is not construed to be limited to the description presented herein, but instead is defined by the following claims.

We claim:

1. An emergency survival apparatus comprising:

an illumination means with a remote control sensor to cast light in a 360 degree arc in response to an infrared signal;

a time-piece integrally contained in a housing with said illumination means and having a display contained in said housing with said time piece;

a television signal receiver means with a remote control sensor to energize receiver circuitry in response to an infrared signal to provide a picture and integrally contained in said housing with said time piece; and a radio signal receiver means with a remote control sensor to provide audible sound in response to an infrared signal, said radio receiver signal means being integrally contained in a housing with said television signal receiver means.

2. The emergency survival apparatus of claim 1, wherein said illumination means, the time-piece, the television signal receiver means, and the radio signal receiver means are powered by a source of direct current.

3. The emergency survival apparatus of claim 1, wherein said illumination means the time-piece, the television receiver means and the radio signal receiver means are powered by a source of alternating current.

4. The emergency survival apparatus of claim 1, wherein said illumination means comprises a dimmer control.

5. The emergency survival apparatus of claim 2, wherein the source of direct current is derived from a converted source of alternating current.

6. The emergency survival apparatus of claim 1, wherein the time-piece comprises an alarm clock.

7. The emergency survival apparatus of claim 2 wherein the source of direct current comprises at least one rechargeable battery.

8. An entertainment apparatus, comprising: =p1 an illumination means with a remote control sensor to cast light in a 360 degree arc responsive to an infrared signal;

a clock having a time of day display integrally contained in a housing with said illumination means;

a television signal receiver means with a remote control sensor to energize receiver circuitry to a display; and a radio signal receiver means with a remote control sensor to provide audible sound in response to an infrared signal, said radio receiver signal means being integrally contained in a housing with said television receiver means.

9. The entertainment apparatus of claim 8, wherein the apparatus is powered by a source of direct current.

10. The entertainment apparatus of claim 8, wherein the source of direct current comprises a battery.

11. The entertainment apparatus of claim 8, wherein the source of direct current is derived from a converted alternating current source.

12. The entertainment apparatus of claim 8, wherein said illumination means comprises a dimmer control.

13. The entertainment apparatus of claim 10, wherein the battery is rechargeable.

14. The entertainment apparatus of claim 8, wherein the clock includes an alarm.

15. A communication apparatus, comprising:

illumination means with a remote control sensor for casting illumination in a 360 degree arc in response to an infrared signal;

means for displaying the time of day integrally contained in a housing with said illumination means;

television receiver means with a remote control sensor to energize receiver circuitry for displaying a television program in response to an infrared signal and integrally contained in a housing with said means for displaying the time of day; and radio receiver means with a remote control sensor to provide audible sound in response to an infrared signal to play a radio program; said radio receiver means being integrally contained in a housing with said television signal receiver means.

16. The apparatus of claim 15, wherein the illumination means, the time of day displaying means, the television means, for displaying a television program and the radio receiver means are powered by a source of direct current.

17. The apparatus of claim 15, wherein the illumination means, the time of day displaying means, the television program displaying means, and the radio receiver means are powered by a source of alternating current.

18. The apparatus of claim 15, wherein the illumination means comprises a dimmer control.

19. The apparatus of claim 16, wherein the source of direct current is derived from a source of alternating current.

20. The apparatus of claim 15, wherein the time of day displaying means includes a user determinable alarm means.

21. The apparatus of claim 16, wherein the source of direct current comprises a rechargeable battery.

22. An entertainment apparatus comprising:

an illumination means with a remote control sensor to cast light in a 360 degree arc responsive to an infrared signal;

a time keeping and displaying means integrally contained in a housing with said illumination means;

means with a remote control sensor responsive to an infrared signal to display a television picture integrally contained in said housing with said time keeping and display means; and means with a remote control sensor responsive to an infrared signal to provide audible sound integrally contained in said housing with said means for receiving and displaying a television picture.

23. The apparatus of claim 22, wherein the apparatus is energized by means for supplying direct current.

24. The apparatus of claim 23, wherein the direct current means comprises a battery.

25. The apparatus of claim 23, wherein the direct current means comprises means for converting alternating current into direct current.

26. The apparatus of claim 22, wherein the illumination means comprises a dimmer control.

27. The apparatus of claim 24, wherein the battery is rechargeable.

28. The apparatus of claim 22, wherein the time keeping and display means includes an alarm.

* * * * *